(12) United States Patent
Hoehne et al.

(10) Patent No.: US 10,851,263 B2
(45) Date of Patent: Dec. 1, 2020

(54) WATER-BASED COATING COMPOSITIONS AND RELATED PRODUCTS AND PROCESSES

(71) Applicant: NOVELIS INC., Atlanta, GA (US)

(72) Inventors: Joerg Hoehne, Goettingen (DE); Emilie Goydadin, Thoiria (FR)

(73) Assignee: NOVELIS INC., Atlanta, GA (US)

( * ) Notice: Subject to any disclaimer, the term of this patent is extended or adjusted under 35 U.S.C. 154(b) by 0 days.

(21) Appl. No.: 15/091,168

(22) Filed: Apr. 5, 2016

(65) Prior Publication Data

US 2016/0289496 A1 Oct. 6, 2016

Related U.S. Application Data

(60) Provisional application No. 62/143,340, filed on Apr. 6, 2015.

(51) Int. Cl.
*C09D 177/02* (2006.01)
*C09D 175/04* (2006.01)

(52) U.S. Cl.
CPC ......... *C09D 177/02* (2013.01); *C09D 175/04* (2013.01)

(58) Field of Classification Search
CPC .... B32B 15/08; C08G 18/6216; C08G 18/73; C08G 18/755; C08G 18/80;
(Continued)

(56) References Cited

U.S. PATENT DOCUMENTS

| 3,644,264 A | * | 2/1972 | Hyde | ............... | C08G 69/18 524/104 |
| 4,220,679 A | * | 9/1980 | Backhouse | ........... | B05D 1/02 427/401 |

(Continued)

FOREIGN PATENT DOCUMENTS

| CN | 101845267 | 9/2010 |
| CN | 101945956 | 1/2011 |

(Continued)

OTHER PUBLICATIONS

Machine translation of DE 4028386. (Year: 1992).*

(Continued)

*Primary Examiner* — John D Freeman
(74) *Attorney, Agent, or Firm* — Kilpatrick Townsend & Stockton LLP

(57) ABSTRACT

Disclosed are improved water-based, polyamide-containing synthetic polymer coating compositions and related products and processes. The coating composition comprises 1 to 40% dry weight of polyamide powder, and can contain higher polyamide content than organic solvent-based coating products containing polyamide and polyurethane. The improved coating compositions are suitable for coating of metal substrates, such as aluminum sheets and panels. The improved coating compositions are also suitable for industrial coil coating processes, forming a thin and uniform coating layer when applied to a metal substrate, such as an aluminum sheet surface. Methods and processes related to production and uses of the coating compositions are described, as well as products produced by the processes using the coating compositions, such as roller shutters and architectural panels.

19 Claims, 3 Drawing Sheets

(58) Field of Classification Search
CPC ......... C08G 18/3206; C08J 7/04; C08J 7/042;
C09D 177/02; C09D 175/04; C09D
133/00; C09D 167/00; C09D 177/00
See application file for complete search history.

(56) References Cited

U.S. PATENT DOCUMENTS

| | | | |
|---|---|---|---|
| 4,253,848 A | | 3/1981 | Porter |
| 4,368,237 A | * | 1/1983 | Yamada ............... G11B 5/7022 427/128 |
| 4,424,239 A | * | 1/1984 | Nota ...................... B05D 7/16 427/388.2 |
| 4,546,045 A | * | 10/1985 | Elias ...................... B05D 7/02 428/424.6 |
| 4,689,361 A | | 8/1987 | Mumcu et al. |
| 5,830,975 A | | 11/1998 | Perraud et al. |
| 5,939,491 A | * | 8/1999 | Wilt ..................... C08G 77/388 525/100 |
| 6,027,814 A | | 2/2000 | Julien et al. |
| 6,080,823 A | * | 6/2000 | Kiriazis .................. C08L 75/04 525/107 |
| 8,857,332 B2 | | 10/2014 | Knabben et al. |
| 2001/0053810 A1 | * | 12/2001 | Mizutani ................. C09D 5/38 524/441 |
| 2002/0037400 A1 | * | 3/2002 | Fujiwara .............. H05K 3/0047 428/330 |
| 2004/0096665 A1 | * | 5/2004 | Hoehne ................. C08G 18/80 428/407 |
| 2005/0049340 A1 | * | 3/2005 | Matsuo ............. C08G 18/3281 524/210 |
| 2007/0032606 A1 | * | 2/2007 | McVay .................. B65D 25/14 525/429 |
| 2011/0042623 A1 | * | 2/2011 | Luer ...................... C08G 69/34 252/500 |
| 2011/0171481 A1 | * | 7/2011 | Kainz ...................... C08J 3/05 428/480 |
| 2013/0287981 A1 | * | 10/2013 | Berger .................... C09D 5/08 428/35.8 |

FOREIGN PATENT DOCUMENTS

| | | | | |
|---|---|---|---|---|
| DE | 4028386 A1 | * | 3/1992 | ............ B05D 7/534 |
| EP | 0047508 A2 | | 3/1982 | |
| EP | 0083139 A1 | | 7/1983 | |
| EP | 1388580 A2 | | 2/2004 | |
| EP | 3060617 B1 | * | 4/2019 | ............ C09D 5/022 |
| WO | WO-0224778 A2 | * | 3/2002 | ......... C08G 18/3206 |
| WO | WO-2013033147 A1 | * | 3/2013 | ............ C09D 133/10 |
| WO | WO-2014081798 A1 | * | 5/2014 | ............ B05D 3/007 |
| WO | WO-2014126741 A2 | * | 8/2014 | ............. C08G 69/44 |
| WO | WO-2015023914 A1 | * | 2/2015 | ............. C09D 5/022 |
| WO | WO-2015061664 A1 | * | 4/2015 | ........... C09D 161/06 |

OTHER PUBLICATIONS

European Application No. 16718774.9, "Notice of opposition to a European patent", Sep. 3, 2020, 42 pages. (Year: 2020).*
International Patent Application No. PCT/US2016/026009, International Search Report and Written Opinion dated Jul. 6, 2016, 10 pages.
International Patent Application No. PCT/US2016/026009, International Preliminary Report on Patentability dated Oct. 19, 2017, 7 pages.
Canadian Application No. 2,979,738, "Office Action", dated Oct. 11, 2018, 3 pages.
European Application No. 16 718 774.9, Office Action, dated Nov. 2, 2018, 5 pages.
European Application No. 16718774.9, "Office Action", dated Feb. 14, 2019, 3 pages.
Korean Application No. 10-2017-7030715, "Office Action", dated Feb. 19, 2019, 8 pages.
Chinese Application No. 201680018625.8, "Office Action", dated Mar. 27, 2019, 19 pages.
Korean Application No. 10-2017-7030715, "Office Action", dated Aug. 21, 2019, 10 pages.
Canadian Application No. 2,979,738, "Notice of Allowance", dated Jul. 8, 2019, 1 page.
Chinese Application No. 201680018625.8, "Office Action", dated Nov. 8, 2019, 18 pages.
European Application No. 16718774.9, "Notice of Decision to Grant", dated Nov. 7, 2019, 2 pages.
Brazilian Application No. 1120170198193, "Office Action", dated Feb. 27, 2020, 5 pages.
Chinese Application No. 201680018625.8, "Office Action", dated Mar. 2, 2020, 18 pages.
Dai et al., "Furniture Coatings and Coating Technology", Chemical Industry Press, Aug. 31, 2000, pp. 50-51.
Feng et al., "Polymer Dictionary", Sinopec Publication, Jun. 30, 1998, p. 548.
Korean Application No. 10-2017-7030715, "Office Action", dated Feb. 13, 2020, 6 pages.
Wen et al., "China Coating Handbook", Chekiang Science and Technology Press, Nov. 30, 1988, p. 25.
Korean Application No. 10-2017-7030715, "Notice of Decision to Grant", dated Apr. 6, 2020, 1 page.
Chinese Application No. 201680018625.8, Office Action, dated Jul. 22, 2020, 4 pages.

* cited by examiner

WATER-BASED COATING COMPOSITIONS AND RELATED PRODUCTS AND PROCESSES

CROSS-REFERENCE TO RELATED APPLICATION

This application claims the benefit of U.S. Provisional Patent Application No. 62/143,340, filed Apr. 6, 2015, which is incorporated by reference herein in its entirety.

FIELD

The invention relates to the fields of material science, material chemistry, polymers, polymer chemistry, synthetic coatings and paints, aluminum product manufacturing and related fields. The invention provides novel polymer coating compositions and related products and processes, which can be employed in production of aluminum products.

BACKGROUND

Polymer-based synthetic coatings are widely used in industries using aluminum parts and components to create protective and/or decorative coatings on aluminum surfaces. Some examples of such coatings are paints and clear coatings used on architectural and automotive panels and components. Coating compositions used to treat aluminum parts and components have to meet various demands. Such coating compositions have to be formulated so that they create coatings with specific properties and characteristics demanded by the industries and the consumers. For example, the coatings have to be adherent, exhibit good abrasion resistance, exhibit mechanical deformability (flexibility) and resist various environmental factors, such as temperature, humidity and exposure to ultraviolet radiation. Continuous automated industrial coating processes create their own demands. For example, coating compositions used in coil coating, which is employed for coating coiled metal sheets before they are cut or otherwise formed, need to be applied quickly in a thin, uniform layer over large surface areas, and dry and cure in sufficiently short time to ensure high efficiency of the coating line.

Coating formulations that employ polyester, polyurethane, and/or other synthetic polymer binders in combination with polyamide are popular for coil coating applications, such as the production of roller shutters and architectural panels. Addition of polyamide leads to improved flexibility, improved abrasion resistance and improved ultraviolet exposure tolerance of the resulting coatings. However, incorporation of sufficiently high levels of polyamide into synthetic polymer coating formulations used in coil coating applications is difficult. Since polyamide is insoluble and is added in a powder form, high levels of polyamide increase the viscosity of the coating compositions. This results in formulations that are not suitable for a coil-coating process or that have an increased thickness of the resulting coating, which, in turn, may adversely affect the coating's properties, decrease the efficiency of the coating process, and increase energy and material costs.

SUMMARY

The terms "invention," "the invention," "this invention" and "the present invention," as used in this document, are intended to refer broadly to all of the subject matter of this patent application and the claims below. Statements containing these terms should be understood not to limit the subject matter described herein or to limit the meaning or scope of the patent claims below. Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

Disclosed are improved polyamide-containing water-based, synthetic polymer coating compositions and related products and processes. Some examples of the synthetic polymer binders suitable for the improved water-based synthetic polymer coating compositions are polyurethanes, polyesters and acrylics. Some examples of the improved water-based coating compositions have a higher content of polyamide than organic solvent-based coating products. The improved coating compositions are suitable for coating of metal substrates, such as aluminum panels and surfaces. The coating compositions form a coating with various advantageous properties, such as flexibility, adhesion, resistance to abrasion, and resistance to dust and other environmental influences, for example, ultraviolet radiation. Improved water-based coating compositions as disclosed herein retain high polyamide content while maintaining viscosity similar to organic solvent-based coating products and are suitable for industrial coil coating processes. In comparison to organic solvent-based products, the disclosed water-based coating compositions form a thinner coating layer when applied to a metal substrate, such as an aluminum sheet surface. This increases the efficiency of the coating process and reduces the production costs by reducing the required drying time and/or temperature, as well as reducing expenditure of the coating composition.

One example of a coating composition includes one or more synthetic polymer binder, one or more cross-linker, 1-40% dry weight of a polyamide, optionally one or more additive, and optionally one or more organic solvent.

In the above coating composition, the one or more synthetic polymer binder may comprise one or more of a polyurethane, a polyester, or an acrylic. The composition is water-based and at least one of the one or more synthetic polymer binders is provided as a waterborne dispersion. The coating composition may comprise 10-40% dry weight of the one or more synthetic polymer binders. The coating composition may comprise 1-40%, 6-35%, or 17-25% dry weight of the polyamide. The coating composition may have a dry weight ratio of the polyamide to the synthetic polymer binder of 1:2 or above. In some cases, the polyamide comprises two or more different types of polyamide. In the coating composition, the polyamide may be polyamide 11, polyamide 12, or their combination. In the coating composition, the one or more cross-linker may comprise one or more polyisocyanate. The one or more polyisocyanates may comprise a blocked isocyanate, hexamethylene diisocyanate (HDI), isophorone diisocyanate (IPDI), or a combination of two or more thereof. In some examples, the coating compositions have a viscosity of 30-200 seconds measured with 4 mm DIN cup at 20° C. In some examples, the coating compositions have viscosities of about 1 to 8 Stokes or about 300 mPas to 4000 mPas measured by ASTM D 2196-86 with a Brookfield viscometer. In some examples, a dry coating layer formed by the coating composition on a metal substrate has a thickness of 2-20 μm. In some examples, the coating layer formed by the composition on the metal substrate has a gloss level of 5-50 units gloss.

Also disclosed are methods and processes related to production and uses of the improved water-based synthetic polymer coating compositions. One such use is coating or painting of metal substrates by a coil coating process.

An example process for preparing the disclosed coating compositions includes the steps of mixing by normal stirring with a dispenser the one or more synthetic polymer binders, the one or more cross-linkers, and optionally the one or more additives. After the step of mixing, the process further includes adding water and optionally the one or more organic solvents. The process further includes introducing the polyamide by a stirring dispersion process after adding the water and optional organic solvents.

Also disclosed are metal substrates coated by the improved coating composition. The metal substrates may be aluminum substrates or steel substrates. Non-limiting examples of the substrate are roller shutters or any product used in an architectural market or suitable for outdoor exposure, such as an architectural panel.

Also disclosed are processes of treating a metal substrate by the coating composition. These processes include the steps of applying the coating composition to a metal substrate and then drying the coating composition. Also disclosed are processes of treating an aluminum substrate with the coating composition. Such processes may include the steps of providing the aluminum substrate as a coiled aluminum sheet, unwinding the coiled aluminum sheet, applying the coating composition to the aluminum substrate after unwinding, and drying the aluminum substrate after applying the coating composition. The above processes may produce 160-200 m of coated aluminum sheet per minute. In some examples of the above processes of treating a metal substrate or an aluminum substrate, the step of drying may be conducted at a temperature of 150 to 280° C. Peak Metal Temperature for 5-100 seconds.

BRIEF DESCRIPTION OF THE FIGURES

FIG. 1A shows an installed and rolled roller shutter. FIG. 1B shows a cross-section of a roller shutter.

FIG. 3A schematically illustrates a line with one coating room (inset), which is shown in more detail in FIG. 3B.

DESCRIPTION

Compositions

Figure 1A:
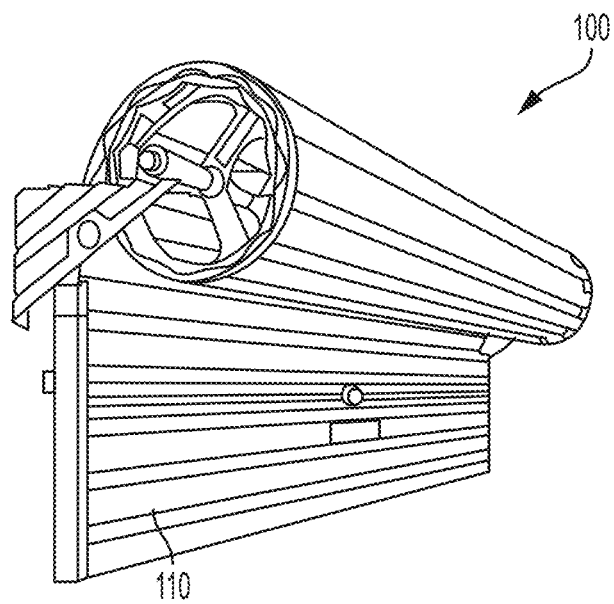
FIG. 1A and FIG. 1B are part of a schematic illustration of a roller shutter.
Figure 1B:
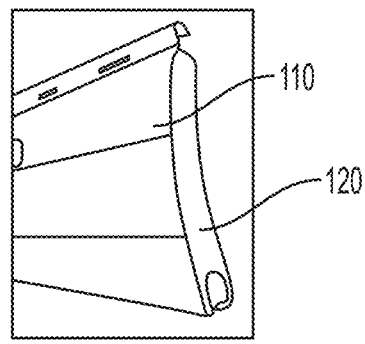

Disclosed are improved water-based synthetic polymer coating compositions, which can be referred to as "formulations," "paint," "coat," "coat paint," "varnish," "coating" or other related terms, in singular or plural. The improved coating compositions are water-based, generally meaning that they contain water as a principal solvent, in contrast to organic solvent-based coating compositions, which employ nonaqueous organic solvents as principal solvents. The water-based coating compositions may also include non-aqueous organic solvents, in addition to water. The improved coating compositions are qualified as "synthetic polymer" coating compositions, meaning that the coating formed by the compositions on a substrate contains synthetic polymer binder molecules. The improved coating compositions also comprise one or more polyamides in an amount from about 1 to about 40% by weight of the dry coating formulation ("dry weight").

The term "dry weight," is used in this document to characterize the content or the amount of a certain component present in a coating composition, other than water and nonaqueous organic solvents. In some cases, "dry weight" means the ratio (which may be expressed as a percentage) of the solids of the component in question to the total weight of the composition, wherein the weight of the water and organic solvents is excluded from the total weight. For example, in reference to polyamide, "dry weight" means the ratio of polyamide powder weight to the total weight of the components present in the composition, where the total weight does not include the weight of the water and organic solvents. In reference to polyurethane and other synthetic polymer binders typically provided as a waterborne liquid suspension, dry weight means the ratio of binder solids present in the suspension (not the weight of the suspension) to the total weight of the composition, where the total weight does not include the weight of the water and other solvents. In some other cases, namely, when the component in question is a liquid or a semi-liquid compound, "dry weight" may mean the ratio of the weight of the liquid or a semi-liquid compound to the total weight of the components present in the composition, wherein the total weight does not include the weight of the water and other solvents. The content of water and organic solvents in the composition is described not as a dry weight but as a ratio (which may be expressed as a percentage) of the weight of water or an organic solvent to the weight of the final composition, the weight of the final composition including water and/or organic solvent or solvents.

Some examples of the improved water-based synthetic polymer coating compositions have a higher content of polyamide than the previously known organic solvent-based synthetic polymer coating products. The improved coating compositions may also comprise cross-linkers and one or more other components (which can be termed "additive" or "additives"), such as defoamers, wetting agents, catalysts (for example, catalysts for polyurethane formation, such as amine compounds or metal complexes), waxes, matting agents and other additives. The improved coating compositions of the present invention are suitable for coating of metal substrates, such as aluminum substrates. After a coating process, which includes the steps of (1) application of the coating composition onto the metal substrate, (2) drying, and (3) curing, the coating compositions form a protective and/or decorative coating on the metal substrate. The improved coating compositions form a coating with various advantageous properties, such as flexibility, adhesion, resistance to abrasion, and resistance to dust and other environmental influences such as ultraviolet radiation. In the improved coating compositions, one or more of these properties are advantageously improved in comparison to previously known organic solvent-based polyamide-containing coatings. The improved coating compositions can form a coating on a metal substrate that is thinner than the coatings formed by organic solvent-based coating products. The decrease in thickness of the coating formed by the improved coating compositions can increase the productivity of a coating process, decrease costs, and save energy. The improved coating compositions and the advantages afforded by these compositions are further discussed below.

The terms "synthetic polymer," "binder," "synthetic polymer binder" "film former" and the related terms, as used in this document, refer to synthetic polymers that form a film in a coating formed by the coating compositions upon the steps of (1) application of the coating composition on a substrate, (2) drying, and/or (3) curing. Synthetic polymer binders can also be described as film-forming components of the coating compositions. In some cases, the synthetic polymer binders can also be referred to as "resin," "resins," or related terms. Upon application of the coating composition on the substrate, the binder forms a film during the process of drying or curing. Although drying may refer to evaporation of the solvent or thinner, it often refers to oxidative cross-linking of the binders, and the term may be used indistinguishably from the term "curing." Coating compositions may rely on polymerization or cross-linking processes occurring in the film-forming component during drying or curing. Curing agents, including catalysts, cross-linking agents, inducers and other types of agents may be employed to induce or facilitate curing, as explained further in this document and illustrated by the descriptions of the relevant processes.

While the coating compositions need to contain at least one synthetic polymer binder component, in some cases more than one (one or more) synthetic polymer binder components, such as two or more, three or more, or four or more components may be employed. The film-forming components of a coating composition influence adhesion and other properties of the coating formed by a coating composition, such as gloss, flexibility, and abrasion resistance. Film-forming components of the coating compositions according to some examples include synthetic polymer binders that can be employed in water-based compositions. Some non-limiting examples of synthetic binders suitable for the improved coating compositions are polyurethanes, polyesters, polyacrylates (also known as acrylate polymers or acrylics), alkyds, vinyl-acrylics, vinyl acetate-ethylene, polyvinyl acetate, styrene polymers and co-polymers (such as styrene acrylic co-copolymers), melamine resins, and epoxy resins. Synthetic polymer binders can be supplied as waterborne dispersions, for example, waterborne acrylic, polyurethane, or polyester dispersions, which may be used in preparation of the disclosed coating compositions. The improved coating compositions may contain from approximately 10-70% (e.g., 10-60, 15-45, 15-40, 20-40, 20-35 or 20-30%) of the synthetic polymer binder component, dry weight. For example, an improved coating composition can contain 15, 20, 35 or 40% dry weight polyurethane. In another example, an improved coating composition contains approximately 5-15% dry weight polyester (e.g., 5, 6, 7, 8, 9, 10, 11, 12, 13, 14, or 15%) and/or 2-10% dry weight acrylic (e.g., 2, 3, 4, 5, 6, 7, 8, 9, or 10%).

The term "polyurethane" (PU) or polyurethane dispersion (PUD) and related terms, as used in this document, refer to co-polymers produced from polyisocyanates (meaning isocyanates that have multiple (two or more) isocyanate (NCO) groups on each molecule) and polyols (meaning compounds with multiple (two or more) functional hydroxyl groups), such as diols. Various types of polyisocyanates may be employed in PU formation. A PU polymerization reaction proceeds via NCO groups of polyisocyanates and hydroxyl groups of polyols. PU-based coating compositions may be formulated with "blocked" polyisocyanates, in which NCO groups are blocked with a protecting moiety, thus preventing polymerization of the coating compositions until they are heated in order to remove the protecting moiety. High temperatures "deblock" the NCO groups, which allows a polymerization reaction with polyols to proceed, resulting in formation of PU molecules. Thus, PUs based on "blocked" polyisocyanates can be polymerized after application of compositions including the polyisocyanates and polyol components onto a substrate. The polymerization is initiated by heating to "deblock" the NCO groups, thus removing the protecting moiety. Coating compositions may also be formulated with reacted PU formulations produced by reacting an excess of polyisocyanates with a polyol or mixture of polyols (e.g., polyester polyols, polyether polyols, or polycarbonate polyols) to form a prepolymer. For example, the improved coating compositions can be formulated as waterborne dispersions of fully reacted PU, referred to as PUD. The PUD are provided as small particles of PU (for example, 0.1 to 3.0 µm in size), dispersed in water to form a chemically and colloidally stable dispersion. The dispersion can be stabilized by external emulsifiers or by including hydrophilic centers (such as cationic or anionic groups) in the polymer. Some examples of PUD suitable for inclusion into the disclosed compositions are waterborne dispersions of polycarbonate-based or polyester-based PU stabilized by hydrophilic centers. In addition to PUD, the disclosed compositions may include PU's with "blocked" isocyanate components. These blocked PU's may be referred to as "hardeners" or "cross-linkers," and they react with prepolymer molecules upon application of the coating composition onto a metal substrate and subsequent heating. The disclosed compositions can include more than one (two, three, four, etc.) type of PU, more than one (two, three, four, etc.) type of PUD, and more than one (two, three, four, etc.) type of isocyanate.

The term "polyester" (PE) or polyester dispersion (PED) and the related terms, as used in this document, refer to one of the binder components that can be used to formulate the disclosed coating compositions. The terms refer to a category of polymers that contain ester functional groups in their main chain. Various types of PEs may be employed in the improved coating compositions, such as aliphatic or aromatic PEs. The terms "acrylate," "polyacrylate," "acrylic" and the related terms refer to polymers derived from acrylic acid and related compounds. In some cases, derivatives or co-polymers of the above compounds with other compounds may be employed in the disclosed coating compositions.

The terms hardeners and cross-linkers and the related terms, as used in this document, refer to compounds that link one polymer chain to another. They may be incorporated into the disclosed coating compositions. For example, various types of isocyanates may be employed as cross-linkers. Such isocyanates include, but are not limited to, aliphatic diisocyanate monomers. Blocked polyisocyanates employed in two-component PU systems which polymerize upon heating may be referred as "hardeners" and may be incorporated into the disclosed coating compositions. In another example, melamine cross-linkers may be employed.

The term "polyamide" (PA) as used in this document refers to a polymer with amide functionality. Some examples of PAs that can be suitably incorporated into the compositions of present invention are PA 12 and PA 11. PA 12 is a polyamide with a hydrocarbon chain containing 12 carbons between each amide linkage, while PA 11 has 11 carbons between each amide linkage. Both PA 11 and PA 12 show similar properties, such as low water absorption and/or abrasion resistance. Some examples of PA 12 suitable for the compositions for the present invention are Orgasol® supplied by Arkema® or Vestosint® supplied by Evonik®. An example of suitable PA 11 is Rilsan® supplied by Arkema®.

Other examples of PAs that can be suitably incorporated into the compositions of the present invention PAs known under the generic designation of "Nylon." For example, a polymer of ω-aminolauric acid monomers or laurolactam monomers may be referred to as Nylon 12. PAs included in coating compositions are typically insoluble and are incorporated into the compositions in powdered form. PA powders that can be incorporated into the compositions of the present invention include ground powders and precipitated powders. PA is typically provided ("delivered") in powdered form. A PA powder can be described by "particle size" or "average particle size," meaning "average particle diameter" or d50, which can be in the range of approximately 1 to approximately 100 μm. The disclosed compositions can include more than one (two, three, four, etc.) type of PA powder, such as powders of different PAs or their mixtures or powders of different average particle size. In coating compositions, the PA component or components may act as texturing agent. Also, PA molecules contain reactive terminal groups, such as terminal carboxyl and terminal amino groups, which react with other components of the coating composition during the coating process. For example, in a coating composition the NCO groups of the isocyanate react with the terminal carboxyl and terminal amino groups of PA, and with the hydroxyl groups of PUD and/or PE. Water-based coating compositions as disclosed herein allow incorporation of advantageously higher amounts of PA and advantageously higher ratios of PA to other components, such as a synthetic binder, for example, PU, in comparison to organic solvent-based coating products. In other words, in the disclosed water-based compositions, one or both of (1) PA content by weight and (2) ratio of PA content to a content of one or more of other components of the composition, such as a synthetic polymer binder, can be higher than in previously known organic solvent-based coating products suitable for coating of metal substrates. Water-based coating compositions according to some examples can comprise PA in an amount of about 1-40%, 5-30%, 5-35%, 5-40%, ≥15%, 15-25%, 15-30%, 15-35%, 15-40%, ≥17%, 17-25%, 17-30%, 17-35%, 17-40%, ≥20%, 20-25%, 20-30%, 20-35%, or 20-40%, for example, about 17%, about 35%, about 30%, about 20%, about 15%, about 10% or about 6% PA by dry weight. Water-based coating compositions as disclosed herein can contain various ratios, by dry weight, of PA to binder (for example, one or more of PU, PE or acrylic), for example, from about 1:5 to about 5:1, from about 1:3 to about 5:1, from about 1:1 to about 1.5:1, from about 1:1 to about 2.5:1, from about 1:1 to 1:3 or above, 1:2.5 or above, 1:2 or above, 1:1.5 or above, 1:1 or above, 1.5:1 or above, about 5:1, 4:1, 3:1, 2:1, 1.4:1, 1.1:1, 1:1, 1:3, 1:4 or 1:5. The term "ratio," when used in this context, means ratio of the weight of PA powder to the weight of solid binder, such as one or more of PU, PE, or acrylic, in a unit weight of a composition. In comparison, known organic solvent-based coating products for metal substrates allow incorporation of a maximum of 15% PA by dry weight and a maximum PA/PU dry weight ratio of 1:3.

In addition to one or more binder, PA and water, the disclosed coating compositions can contain various other components, such as, but not limited to, cross-linkers and/or catalysts (for example, for PU or PE film formation), defoamers, wetting agents, waxes, matting agents, stabilizers, dyes, pigments, and/or organic solvents. Some non-limiting examples of the components that can be incorporated into the coating compositions are described below. Defoamers are the agents having low surface tension that penetrate foam lamellae to destabilize them and make them burst. Some broad categories of defoaming agents are silicone defoamers, oil-based defoamers or polymer-based defoamers. One example of defoamers employed in the disclosed compositions is polyether siloxane copolymer. Some examples of the wetting additives employed in the disclosed compositions are polyether modified siloxanes, multi-functional siloxane surfactants, and alkoxylates. Waxes may be used to improve the glide properties of the surface and to improve scratch resistance. Some non-limiting examples of suitable waxes are carnauba wax, polyethylene wax, polyolefin wax, polytetrafluorethylene wax, and amide wax. While coating compositions are water-based, meaning that water is used as a principal solvent, nonaqueous water-miscible organic solvents, such as, but not limited to, esters, for example, butylglycol or Rhodiasov, may be included in the compositions of the present invention. Matting agents, such as micronized matting polyurea, may also be included.

TABLE 1

Exemplary formulations of the improved coating compositions.

| Component | Composition 1 | Composition 2 | Composition 3 |
|---|---|---|---|
| Synthetic polymer binder (for example, but not limited to, PU, PE, acrylic), % dry weight | 10-60 | 15-40 | 20-30 |
| Cross-linker (for example, but not limited to, blocked isocyanate, melamine), % dry weight | 5-30 | 5-20 | 5-10 |
| PA (for example, but not limited to PA 11 or 12), % dry weight | 1-40 | 5-35 | 17-35 |
| Wax, % dry weight | 0-10 | 0-3 | 0-1 |
| Defoamer, % dry weight | 0-8 | 0-1 | 0-0.5 |
| Wetting agent, % dry weight | 0-8 | 0-1 | 0-0.5 |
| Catalyst, % dry weight | 0-8 | 0-1 | 0-0.5 |
| Pigment, % dry weight | 0-30 | 0-20 | 0-5 |
| Organic solvent, % weight/weight of the final composition | 0-50 | 0-20 | 5-10 |
| Water, % weight/weight of the final composition | 1-80, 5-80 | 10-60 | 30-50, 20-70 |

The description provided below and in Table 1 illustrates formulation of exemplary coating compositions. The list of the components listed below and in Table 1 and described as "present" in the composition is non-limiting. Some examples of the compositions of the present invention include the listed components, but other components may also be included. Some other examples may consist of only or essentially of the listed components. When the content range of the component has a lower limit of zero (0), it means that the presence of the component is not required (that is, is optional) at least in some of the compositions. Some examples of the compositions are as follows. In some examples, a binder (meaning one or more binders) is present in an amount of 10-60, 15-40 or 20-30% dry weight. In some other examples, a first binder is one or more of PU, PE, or acrylic, and is present in an amount of 10-60, 15-40 or 20-30% dry weight. A second binder is present in an amount of 0-10, 0-5 or 1-5% dry weight. A cross-linker (meaning one or more cross-linkers), such as, but not limited to, one or more of isocyanate or melamine, is present in an amount of 5-30, 5-20 or 5-10% of dry weight. A PA (meaning one or more PAs), such as, but not limited to, one or both of PA 11 or 12, is present in an amount of 1-40, 5-30 or 15-25% dry weight. A wax (meaning one or more waxes) is present in an amount of 0-10, 0-3 or 0-1% dry weight. A defoamer (meaning one or more defoamers) is present in an amount of 0-8, 0-1 or 0-0.5% dry weight. A wetting agent (meaning one or more wetting agents) is present in an amount of 0-8, 0-1 or 0-0.5% dry weight. A catalyst (meaning one or more catalysts) is present in an amount of 0-8, 0-1 or 0-0.5% dry weight. A pigment (meaning one or more pigments) is present in an amount of 0-30, 0-20 or 0-5% dry weight. Water is present in an amount of 1-80, 5-80, 10-60, 20-70 or 30-50% weight/weight of the final composition. Organic solvent is present in an amount of 0-50, 0-20 or 5-10% weight/weight of the final composition.

Another exemplary composition includes 10-60% dry weight synthetic polymer binder, 5-30% dry weight cross-linker, 1-40% dry weight PA, 0-10% dry weight wax, 0-8% dry weight defoamer, 0-8% dry weight wetting agent, 0-8% dry weight catalyst, 0-30% dry weight pigment, 0-50% weight/weight of the final composition organic solvent, and 1-80% weight/weight of the final composition water. One exemplary composition includes 10-60% dry weight first synthetic polymer binder, wherein the first synthetic polymer binder is one or more of PU, PE or acrylic, 0-10% second synthetic polymer binder, 5-30% dry weight cross-linker, 1-40% dry weight PA, 0-10% dry weight wax, 0-8% dry weight defoamer, 0-8% dry weight wetting agent, 0-8% dry weight catalyst, 0-30% dry weight pigment, 0-50% weight/weight of the final composition organic solvent, and 1-80% weight/weight of the final composition water. Another composition includes 15-40% dry weight synthetic polymer binder, 5-20% dry weight cross-linker, 5-35% dry weight PA, 0-3% dry weight wax, 0-1% dry weight defoamer, 0-1% dry weight wetting agent, 0-1% dry weight catalyst, 0-20% dry weight pigment, 0-20% weight/weight of the final composition organic solvent, and 10-60% weight/weight of the final composition water. Another exemplary composition comprises 15-40% dry weight first synthetic polymer binder, wherein the first binder is one or more of PU, PE or acrylic, 0-5% second binder, 5-20% dry weight cross-linker, 5-35% dry weight PA, 0-3% dry weight wax, 0-1% dry weight defoamer, 0-1% dry weight wetting agent, 0-1% dry weight catalyst, 0-20% dry weight pigment, 0-20% weight/weight of the final composition organic solvent, and 10-60% weight/weight of the final composition water. Another exemplary composition includes 20-30% dry weight synthetic polymer binder, 5-10% dry weight cross-linker, 17-35% dry weight PA, 0-1% dry weight wax, 0-0.5% dry weight defoamer, 0-0.5% dry weight wetting agent, 0-0.5% dry weight catalyst, 0-5% dry weight pigment, 5-10% weight/weight of the final composition organic solvent, and 30-50% weight/weight of the final composition water. Another exemplary composition includes 20-30% dry weight first synthetic polymer binder, wherein the first binder is one or more of PU, PE or acrylic, 0-5% or 1-5% dry weight second synthetic polymer binder, 5-10% dry weight cross-linker, 17-35% dry weight PA, 0-1% dry weight wax, 0-0.5% dry weight defoamer, 0-0.5% dry weight wetting agent, 0-0.5% dry weight catalyst, 0-5% dry weight pigment, 5-10% weight/weight of the final composition organic solvent, and 30-50% weight/weight of the final composition water.

Some coating compositions are used to create a "clear" coating layer, meaning a layer with a relatively high degree of visual transparency. Such a clear coating layer may be applied onto a metal substrate as a final protective layer after application of a paint coating. However, a paint coating need not be applied; a "clear" coating layer may be applied directly onto a metal substrate or after application of one or more of pretreatment or primer coatings. Even when the compositions are intended to create a "clear" coating, they may contain pigments or tints. Some other examples of the coating compositions are used to create opaque or colored coatings, and may contain various pigments, tints or fillers to create a corresponding visual effect.

The disclosed compositions have properties and specifications desirable in the compositions used for coating of metal substrates, such as viscosity. For example, the disclosed water-based coating compositions can have a viscosity in the range of about 30 to 200 seconds, measured at 20° C., when measured with a 4 mm cup according to DIN EN ISO 2431. For example, a composition can have a 2:1 PA/PU ratio, about 40% of PA 12, by dry weight, and have a viscosity of about 120 seconds. In comparison, for the same PA content, a solvent based-coating exhibits a much higher viscosity. An organic solvent-based coating product having the same viscosity as the disclosed compositions and comparable PU content can retain a maximum of about 15% of PA 12, dry weight. Not intending to be bound by theory, the PA in organic solvent-based coatings absorbs solvent and swell, so the viscosity increases. In contrast, the disclosed water-based coatings, PA 11 and/or PA 12 do not absorb water, so the viscosity does not increase with their addition. In an organic solvent-based coating, no more than 15% dry weight of PA 11 and/or PA 12 can be added without creating agglomerates. The resulting viscosity is so high (higher than 120 seconds when measured according to the above-described standard), that it is not possible to use the resulting formulation for coil coating.

While not wanting to be bound by the following statement, the ability of the disclosed water-based compositions to retain higher PA content while maintaining viscosity similar to organic solvent-based coating products with lower PA content may be a result of the grains of PA powder exhibiting less swelling in water than in organic solvents. However, the above mechanism is not intended to be limiting, unless specifically stated so. Regardless of the mechanisms involved, PA content and/or ratio of PA to other components, such as synthetic polymer binder (for example, one or more of PU, PE, or acrylic), in the disclosed coating compositions affords the disclosed compositions and the resulting coatings and coated products unexpected and advantageous properties, such as, but not limited to, flexibility of the formed coating, its resistance to abrasion, matte (low gloss) surface and dust resistance. Coatings formed by the disclosed compositions are advantageously resistant to environmental influences, for example, UV radiation.

The properties and advantages of the disclosed compositions can be described in reference to quantitative values determined by various testing procedures and protocols. Some of the tests and protocols, which can be also referred to as "norms," reference DIN numbers for the standards published by Deutsches Institut für Normung e. V. (German Institute for Standardization), Berlin, Germany. Some other tests and protocols reference ASTM numbers published by ASTM International (USA). Accordingly, the standards are described in corresponding publications by Deutsches Institut für Normung e. V. or ASTM International. For example, surface gloss of the coating can be determined by measuring specular reflection using a gloss meter. The gloss of the coating formed by a composition as disclosed herien can be in the range of 5 to 50 units gloss, measured under a 60° angle using norm DIN EN 13523-2 assay. Flexibility of the coating can be assessed by using DIN EN 13523-7, an assay of folding T, which is a method of evaluating the flexibility and adhesion of an organic coating on a metallic substrate by observing the cracking or loss of adhesion, when a coated test panel is bent. In the assay of folding T, the coatings formed by the disclosed compositions can exhibit performance in the range of 0-0.5 T.

Resistance to abrasion can be evaluated by a Taber test, using norm ASTM D 4060-90, which measures the weight and thickness loss of the coating after 1000, 2000, 3000 or other number of specified turns (cycles) of two bearing wheels of CS-10 type, with a 500 g weight applied to each wheel. On the Taber test, the coatings formed by the disclosed compositions can exhibit abrasion resistance of ≤20 mg for 1000 turns. UV resistance is determined by exposing the coatings to different types and levels of UV radiation, using norm DIN EN 13523-4. For example, UV-A and UV-B resistance tests can be performed, during which the sample is exposed to 341 nm UV radiation for UV-A resistance testing and to 313 nm UV radiation for UV-B resistance testing, in two different tests, for 4 hours at a temperature of 60° C. and ambient humidity, then for 4 hours with 100% relative humidity at 50° C. Coatings formed by the disclosed compositions can exhibit UV resistance of at least 70% gloss left after 1000 hours UV-A. Coatings according to some examples can exhibit at least 80% gloss left after 500 hours of UV-B exposure.

Another advantage of the disclosed coating compositions is a reduction of the thickness of the (wet) coating layer upon application to metal substrate, as well as reduced thickness of the formed dry coating layer. For example, the thickness of the dry coating layer formed by the disclosed compositions on a metal substrate can be about 2-20 µm. The disclosed coatings show improved properties in this area, such as having a lower thickness than a dry coating from a solvent-based paint with close or similar synthetic polymer binder content. In another example, the thickness of the dry coating layer formed by the disclosed compositions can be 2-20 µm, and the dry coating layer can also exhibit other improved properties, such as those described in this document, when compared to an organic solvent-based coating with close or similar synthetic polymer binder content. In comparison, a typical dry coating layer formed from an organic solvent-based product with a comparable PA and binder content has a thickness of about 10-30 µm.

Reduced thickness of the dry coating layers formed by the disclosed compositions results in a number of advantages. For example, reduced thickness upon application of the coating allows for reduced drying time of the coating layer after application. The reduction in drying time in turn increases the efficiency of the coating process. For example, an industrial coil coating line (discussed in more detail below) can experience a 35% increase in processing speed if a water-based coating composition as disclosed herein is substituted for an organic solvent-based coating product. In addition, reduced thickness of the water-based compositions can lead to cost savings through reduction in the costs of the materials (since a smaller amount of the coating composition needs to be applied per surface area) and in energy costs (due to the decreased drying time).

The compositions disclosed herein exhibit improved adhesion to aluminum substrate, which allows such compositions to be applied directly to aluminum substrate, degreased and pretreated with a chromium pretreatment or with a chromium-free pretreatment. The disclosed compositions can be applied directly on such a substrate as a one-layer coating. The compositions can also be applied over a primer or a base coat to form a top coat.

Processes of Making

Also disclosed are exemplary methods and processes of obtaining or making the improved water-based, polyamide and polyurethane containing coating compositions. In the disclosed processes of making, synthetic polymer binders are mixed with other components (such as additives) using normal stirring with a disperser. Water and solvent are then added. PA powder is introduced last and is added by a normal stirring dispersion process, such as those typically used by paint producers. Comparable solvent-based formulations typically require intensive dispersion with a blade electric mixer to incorporate PA into the paint. In contrast to the processes for preparing comparable solvent-based formulations, in the processes of making the disclosed compositions, no fast stirring is needed to incorporate the PA powder, as it disperses easily into the formulation without creating agglomerations.

Processes of Using and the Resulting Products

Also disclosed are exemplary methods and processes related to uses of improved water-based synthetic polymer coating compositions, as well as the products obtained by using improved water-based, polyamide- and polyurethane-containing coating compositions. The improved coating compositions are used for treating, such as coating or painting, of metal surfaces or substrates. Accordingly, methods or processes of using the disclosed coating compositions can be referred to as methods or processes for coating, treating, or painting, or as corresponding uses. The improved coating compositions can be employed for various reasons, for example, for protection, to improve appearance, to improve anticorrosion resistance, or for other reasons. The methods and processes related to using the improved coating compositions are not intended to be limited by the above reasons or results obtained, unless specifically stated.

The term "metal surface" as used herein generally means an outer part of a quantity of a metal, such as an aluminum alloy, or a metal substrate, article or object. The term "metal substrate" is intended to encompass any surface, object, material or article that can be treated, such as covered, painted, or coated, by the improved water-based coatings of the present invention. The terms "metal substrate" or "metal surface" are not intended to be limited by the type of the metal employed. The metal surfaces or substrates suitable for treatment by the improved water-based coating can be comprised of aluminum alloyed with various elements, such as Si, Mg, Cu etc., as well as the surfaces or substrates comprised of substantially pure aluminum. In this case, the metal surface or substrate can be referred to "aluminum alloy surface," "aluminum alloy substrate," "aluminum surface," "aluminum substrate" or other related terms. The terms "aluminum surface," "aluminum substrate" or other related terms are not intended to be limited by the type of an aluminum employed, whether the aluminum is alloyed or unalloyed. The disclosed coating compositions can also be used on steel substrate.

Non-limiting examples of metal substrates treated by the improved coating compositions are metal sheets, including coiled metal sheets not subjected to further cutting and forming; metal sheets formed by cutting and optionally other forms of shaping (such as punching, stamping or pressing); substantially flat or three-dimensionally shaped metal panels; metal articles or objects (including articles or objects assembled from or including metal sheets and/or panels). More generally, metal substrates treated by the improved coating compositions encompass metal surfaces or articles and other products or parts including metal surfaces. A metal substrate, such as the examples discussed above, can include components other than or in addition to those specifically discussed, including non-metal components. One example of a metal substrate is a roller shutter, which can also be referred to as a roll shutter, roll-down shutter, or other related terms. These and related terms generally refer to curtain-like structures comprised of aluminum panels or profiles, which can be roll-formed or extruded. An example of a roller shutter (100) is illustrated in FIG. 1A. In addition to aluminum panels (110), roller shutters may include other components, including non-metal components, such as insulation (120). Roller shutters can be installed in window and door openings, or other types of openings, for protection, insulation, and other purposes. For example, roller shutters can be installed for break-in protection, protection from view, sun protection, weather protection, noise protection, temperature or light control, etc. Either roller shutters or the panels of roller shutters can be described as "substrate." Other examples of metal substrates include parts or panels used in machinery (such as parts or panels for motor vehicles, ships, or aircraft); parts or panels used in appliances, kitchen equipment, hardware, laboratory equipment, or industrial equipment; electronic housing parts; construction parts; architectural parts or panels; or parts or panels used in any other suitable application. For example, the improved water-based coatings can be used for treating architectural panels, such as siding, or whole facade coverings. The term "metal substrate," including "aluminum substrate," can encompass a wide range of articles, objects or products and can be of any size or thickness. A substrate may have any thickness, for example, a thickness from about 0.1 mm to 4 mm (0.1, 0.5, 1.0 1.5, 2.0, 2.5, 3.0, 3.5, 4.0 mm). Moreover, metal substrates coated with the improved coating compositions can be used in a wide range environments or conditions, including temperature and humidity ranges, and can be used in indoor as well as outdoor conditions.

Figure 2:
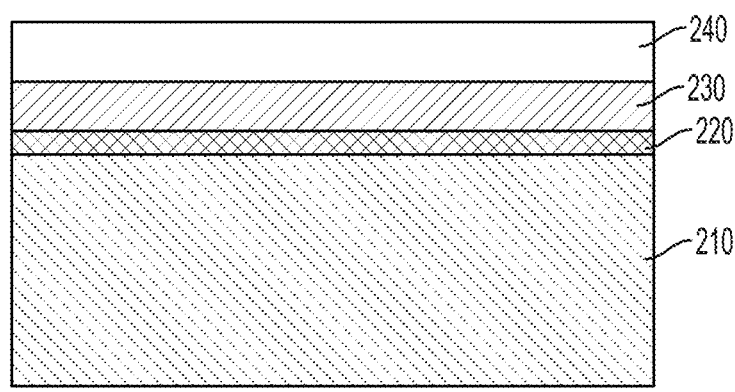
FIG. 2 is a schematic illustration of a cross-section of an aluminum substrate (1) with several coatings, including pre-treatment coating (2), paint coating (3), clear coating (4).

The terms "substrate" or "surface" can denote a treated or untreated metal substrate or surface. These and related terms can also denote a substrate or surface before, after, or during treatment. Furthermore, various types of treatments and coatings can be used in or applied onto substrates or surfaces in addition to the improved water-based coatings. Other treatments and coatings can be applied before, after, or in between the applications of the improved water-based coatings. For example, the metal substrate or surface can be subjected to degreasing, smoothing, texturizing, sanding, sand-blasting, etching, priming, painting, varnishing, or other treatments. One or more of each of the following may be applied to a substrate: a pre-treatment coating, a primer, a paint coating, a clear coating, or a varnish. An example of an aluminum substrate with several coatings is schematically illustrated in FIG. 2. In FIG. 2, an aluminum substrate 210 is coated with a pretreatment coating 220 that may include chromium or may be chromium-free. The pretreatment coating 220 is coated with a base coat 230 that may include a polyester or polyurethane. The base coat 230 is coated with a clear coat 240 that may be a polyurethane/polyamide blend.

Also disclosed are processes of using the improved coating compositions. When the improved coating composition is used for treating a metal substrate, the coating composition is applied onto the metal surface or substrate by various suitable methods and techniques under the conditions leading to formation of the stable coating on the metal substrate. For example, application can be by immersion, brush coating, spraying (spray coating), flow coating, knife coating, or roller coating, which is also known as coil coating.

Figure 3A:
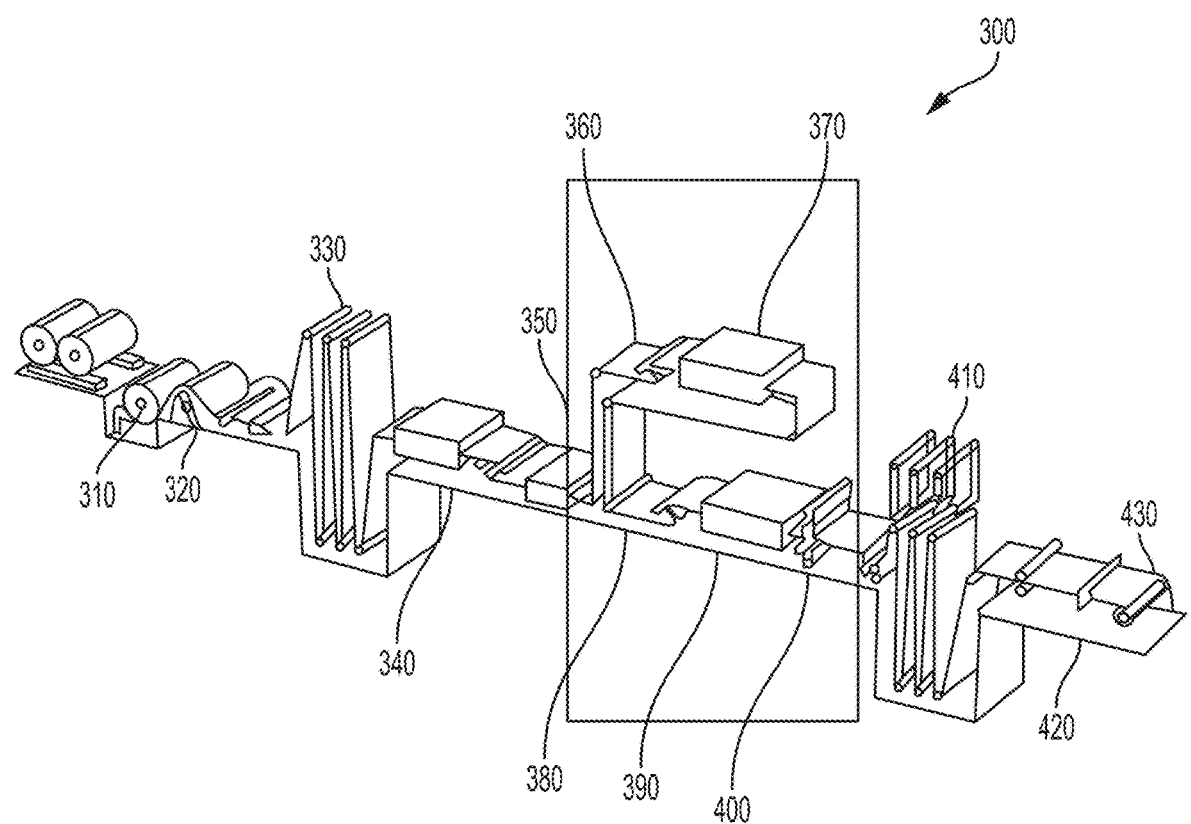
FIG. 3A and FIG. 3B are a part of a schematic illustration of a coil-coating line.

The terms "coil coating," "roller coating" and related terms may be used interchangeably to refer to a continuous automated industrial process for efficiently coating coiled metal sheets before the metal sheets are cut or otherwise formed. Coil coating allows for treatment of the entire surface of the metal sheet, providing tightly-bonded finishes and uniform coating. Coil coated metal surfaces, which can also be called pre-painted, are often more durable and more corrosion-resistant than metal surfaces painted after forming or shaping (post-painted metal). Coil coating process can be generally described as follows, although variations or deviations from the below non-limiting description are possible. An industrial coil coating line 300 is schematically illustrated in FIG. 3A. During coil coating, a metal substrate, such a steel or aluminum sheet is provided in a form of a coiled strip 310, which can be also described as coiled sheet or coil. The metal coil 310 is positioned at the beginning of the coating line 300, which may include, but is not limited to, an uncoiler 320, an entrance accumulator 330, a pretreatment area 340 for cleaning and/or conversion coating, a drier 350, a prime coater 360, a curing oven 370, a top coater 380, a finish cover 390, a water quench bath 400, an exit accumulator 410, a cut-off 420, an a recoiler 430. In one continuous process, the coil is unwound, cleaned, treated, primed, and painted before being recoiled on the other end and packaged for shipment. A coil coating line can process metal sheet at a high speed, for example, at least 160 m/min, or up to 200 m/min. A coil coating process can include a combination of some or all of the following or related steps: attaching the metal sheet entering the line to the previous sheet in the line, which can be referred to as "stitching"; unwinding (uncoiling) the coil; flattening the strip; cleaning the strip; pre-treating the metal substrate with chemicals; drying; applying a primer or a base coat on one or both sides of the metal strip; one or more curing steps; cooling; applying one or more layers of coating; cooling; and rewinding of the coated sheet. The above steps are not intended to be limiting, and other (or fewer) steps may be involved.

Figure 3B:
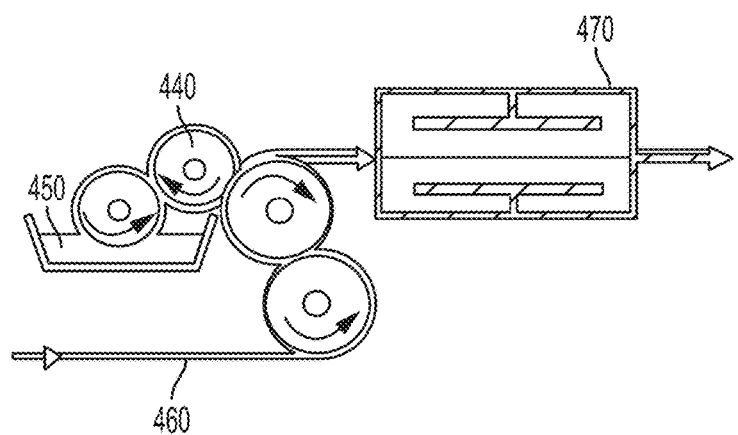

The specific steps and conditions involved in a coil coating process are determined by various factors, such as the type of a coil coating equipment, the type of coating, and/or the type of a metal substrate being coated. For example, an aluminum substrate subjected to a coil coating process may need to be degreased and/or cleaned prior to application of any coatings. A pretreatment coating can then be applied to improve a bond between the metal and subsequent coatings, in addition to improving corrosion resistance. Chromium or titanium based products may be used as pre-treatments. After pretreatment, an aluminum substrate is dried, and then may be subjected to application of primers, for example, by rollers, on one or both sides of the substrate. The aluminum substrate can then be cured in an oven at a high temperature, for example, 150-280° C., for an appropriate time, for example, 5-100 seconds. Upon exiting the oven, the aluminum substrate is cooled, for example, by air and/or water. A coating composition is then applied, and then cured in a curing oven, as schematically illustrated in FIG. 3B. FIG. 3B illustrates rollers 440 applying a liquid coating 450 to metal strip 460. The coated aluminum sheet then passes through a curing oven 470. The substrate is subsequently cooled. Thus, the coil coating processes and lines that involve application of several coatings or coating layers require a corresponding number of coating rooms and ovens and a corresponding number of coating application steps and curing steps. After application of the top coat, the aluminum substrate can be additionally printed, striped and embossed to create special visual effects. After the treatment, the aluminum substrate may be recoiled and/or further processed, for example, by cutting. While the above-described process steps are applicable to the treatment of aluminum substrate, they can also be adapted to the treatment of other substrates, such as steel.

As discussed earlier, the improved coating compositions result in a thinner coating layer on a metal substrate when applied onto a metal substrate, in comparison to organic solvent-based formulation. For example, the coating layer formed by the disclosed compositions can be about 5-8 μm thick or have 40-45% reduction in thickness in comparison to a coating layer formed by an organic solvent-based product. Reduced thickness of the coatings advantageously affects the coating processes. For example, reduced thickness allows for reduced drying time of the coating layer after application, and/or lower drying or curing temperatures. The reduction in drying and/or curing time or temperature in turn increases the speed coating process. For example, an industrial coil coating line (discussed in more detail below) can experience a 30-35% increase in processing speed, which can achieve a speed of 160-200 m/min, if a water-based coating composition as disclosed herein is substituted for an organic solvent-based coating product. In addition, reduced thickness of the coating layer from water-based compositions can lead to cost savings through the reduction in the costs of the materials (since a smaller amount of the coating composition needs to be applied per surface area) and in energy costs (due to the decreased drying time and/or temperature). Curing time of the coating described in the present invention can be from 5 to 100 seconds with a Peak Metal Temperature (PMT) varying from 150° C. to 280° C. The following examples are for illustration only without constituting any limitation thereof. Various embodiments, modifications and equivalents thereof which, after reading the description herein, may suggest themselves to those skilled in the art without departing from the spirit of the invention.

TABLE 2

Laboratory formulations of the coating compositions

| | Formulation | | | | | |
|---|---|---|---|---|---|---|
| | 1 | 2 | 3 | 4 | 5 | 6 |
| PU 1, % dry weight | 28.0 | | 35.0 | 2.0 | | |
| PU 2, % dry weight | | 40.0 | | | 15.5 | 15.0 |
| Acrylic, % dry weight | | 2.0 | | | | 10.0 |
| Isocyanate 1, % dry weight | 7.0 | 10.0 | | 8.0 | 8.0 | |
| Isocyanate 2, % dry weight | | | 8.0 | | | 15.0 |
| PE 1, % dry weight | 3.0 | | | 10.0 | | |
| PE 2, % dry weight | | | | | 10.0 | 10.0 |
| Anti-foam, % dry weight | 1.0 | 1.0 | 1.0 | 0.5 | 1.0 | 1.0 |
| Wetting agent, % dry weight | 0.5 | 1.5 | 1.0 | 0.5 | 0.5 | 1.0 |
| Wax, % dry weight | 0.5 | 0.5 | 2.0 | 1.0 | 1.0 | 1.0 |
| Water, % weight/weight of the final composition | 20.0 | 27.0 | 27.0 | 20.0 | 25 | 35.0 |
| Organic solvent 1, % weight/weight of the final composition | 5.0 | 5.0 | 2.0 | 6.0 | 3.0 | 5.0 |
| Organic solvent 2, % weight/weight of the final composition | | 3.0 | 7.0 | 4.0 | 1.0 | 1.0 |
| PA, % dry weight | 35.0 | 10.0 | 17.0 | 30.0 | 35 | 6.0 |

EXAMPLES

Example 1

Laboratory Formulation and Testing of the Coating Compositions

Coating compositions were produced according to the formulations illustrated in Table 2. The compositions were prepared and mixed at room temperature (15-35° C.). The components of the formulations were added in the order listed in Table 2. Only short to average stirring duration (e.g., 15 minutes at 10-20 m/s) was necessary to sequentially incorporate the raw materials. It was observed that PA dispersed very easily.

The components employed in the laboratory formulations and listed in Table 2 were provided as follows. PU 1 and PU 2 were provided as two waterborne polyurethane dispersions from two different suppliers. Acrylic was provided as a waterborne dispersion. Isocyanate 1 and 2 were provided as two water-based blocked isocyanates from two different suppliers. PE 1 and 2 were provided as two different polyesters. Anti-foam was a water-based anti-foaming additive. Wetting agent was a water-based wetting additive. Wax was a water-based wax. Water was demineralized water. Organic solvent 1 and 2 were two solvents compatible with water with high boiling point. PA was PA 11, PA 12, or a mixture of both.

Examples of suitable isocyanates include, but are not limited to, hexamethylene diisocyanate; 2,2,4-trimethyl-1,6-hexane diisocyanate; cyclohexyl-1,4-diisocyanate; isophorone diisocyanate; dicyclohexylmethane-4-4'-diisocyanate; 1,3,5-trimethyl(2,4-ω-diisocyanatomethyl) benzene; toluene diisocyanate; and diphenylmethane-4,4'-diisocyanate. Examples of suitable polyurethanes include, but are not limited to, the adduct of one molecule of 1,4-butanediol and two molecules of isophorone diisocyanate or hexamethylene diisocyanate; dicyclohexylmethane-4,4'-diisocyanate; 1,3,5-trimethyl (2,4-ω-diisocyanatmethyl) benzene; toluene diisocyanate; and diphenylmethane-4,4'-diisocyanate. Hydroxyl-functional binders react with the isocyanate groups of the optionally blocked di- or polyisocyanate, for example. Suitable waxes may be based on polyethylene. Suitable polyamides include, but are not limited to, polyamide 6, 11, and 12.

Formulations 1-6 were applied on aluminum substrates previously washed, cleaned pretreated and coated with PE-based (white) or PU-based (brown) base coats. The formulations were applied onto the substrate with a bar coater, then cured in the oven to reach a PMT of 220 to 245° C. Upon curing, the coating was tested to measure various properties such as flexibility, abrasion, UV resistance and/or corrosion resistance. The formulations exhibited improved properties in comparison to organic solvent-based formulations with comparable binder content. The formulations of Table 2 with different PA content exhibited different structure, gloss and abrasion resistance. For example, Formulation 3, when applied with a thickness of 10 μm (final dry coating thickness) on a white PE based coat, exhibited gloss level of 20 units measured at 60°. After exposure to 1000 hours of UV-B, the clear coat still retained 80% of the original gloss. Formulation 3 showed good adhesion and inter-coat adhesion, a flexibility of 0.5 T and good abrasion resistance with 4 mg lost after 1000 Taber turns. Similarly, Formulation 1, when applied with a thickness of 8 μm (final dry coating thickness) on a white PE based coat, exhibited gloss level of 20 units measured at 60°. After exposure to 1000 hours of UV-B, the clear coat still retained 100% of the original gloss, and after exposure to 2000 hours of UV-B, the clear coat still retained 80% of the original gloss. Formulation 1 showed good adhesion and inter-coat adhesion, a flexibility of 0.5 T, and good abrasion resistance with 3 mg lost after 1000 Taber turns.

Example 2

Production and Application of a Coating Composition on a Coil-Coating Line 400 kg of the water based clear coat was produced according to Formulation 1 discussed in Example 1 and used on a coating line to coat a rolled aluminum sheet. The paint was applied at 160 meters per minute, on top of a white base coat, forming a coating with a dry thickness of approximately 6 to 10 μm. The resulting coating appeared as film of uniform structure, with no visible yellowing and defects. The coating exhibited good adhesion to the base coat, it was difficult to remove the clear coat from the base coat and substrate, and gloss level was measured to be 25 units. The aluminum painted product's properties were similar to the laboratory results.

All patents, patent applications, publications, and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those of skill in the art without departing from the spirit and scope of the invention as defined in the following claims.

The invention claimed is:

1. A coating composition comprising water, 10-40% dry weight of synthetic polymer binders, a polyisocyante crosslinker, and 15 to 40% dry weight of a polyamide, wherein the synthetic polymer binders are a polyurethane and a polyester; and wherein the coating composition comprises a dry weight ratio of the polyamide to the synthetic polymer binders of 1:1 or above.

2. The coating composition of claim 1, further comprising one or more organic solvents.

3. The coating composition of claim 1, comprising 15 to 35% dry weight of the polyamide.

4. The coating composition of claim 1, comprising 17-35% dry weight of the polyamide.

5. The coating composition of claim 1, wherein the polyamide comprises polyamide 11, polyamide 12, or a combination thereof.

6. The coating composition of claim 1, wherein the polyisocyanate crosslinker comprises at least one blocked isocyanate moiety.

7. The coating composition of claim 1, wherein the polyisocyanate crosslinker comprises a polyurethane, hexamethylene diisocyanate (HDI), isophorone diisocyanate (IPDI), or a combination thereof, and wherein the polyisocyanate crosslinker comprises blocked isocyanate moieties.

8. The coating composition of claim 1, having a viscosity of 30-200 seconds measured with 4 mm DIN cup at 20° C.

9. The coating composition of claim 1, wherein the polyisocyanate crosslinker is present in an amount from 5 to 30% dry weight.

10. The coating composition of claim 1, wherein the dry weight ratio of the polyamide to the synthetic polymer binders is from 1:1 to 2.5:1.

11. The coating composition of claim 1, further comprising from 0 to 10% by dry weight of a wax.

12. The coating composition of claim 1, further comprising from 0 to 8% by dry weight of at least one of a catalyst, defoamer, wetting agent.

13. The coating composition of claim 1, further comprising from 0 to 30% by dry weight of a pigment.

14. The coating composition of claim 1, further comprising from 0 to 50% by weight/weight of the final composition organic solvent and from 1 to 80% weight/weight of the final composition water.

15. A substrate comprising a coating layer formed from the coating composition of claim 1.

16. The substrate of claim 15, wherein the coating layer is dry and comprises a thickness of 2-20 μm.

17. The substrate of claim 15, wherein the coating layer has a gloss level of 5-50 gloss units, measured according to standard DIN EN 13523-2 at an angle of 60°.

18. The substrate of claim 15, wherein the substrate comprises a metal.

19. The substrate of claim 18, wherein the metal comprises aluminum or steel.

* * * * *